US011078823B1

(12) United States Patent
Sciacca

(10) Patent No.: US 11,078,823 B1
(45) Date of Patent: Aug. 3, 2021

(54) ENGINE THERMAL MANAGEMENT DEVICE ASSEMBLY HAVING AN ENGINE ACCESSORY MOUNTING BRACKET

(71) Applicant: GM Global Technology Operations LLC, Detroit, MI (US)

(72) Inventor: Patrizio Sciacca, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/782,756

(22) Filed: Feb. 5, 2020

(51) Int. Cl.
*F01P 3/02* (2006.01)
*F01P 5/12* (2006.01)

(52) U.S. Cl.
CPC ........ *F01P 3/02* (2013.01); *F01P 5/12* (2013.01); *F01P 2003/027* (2013.01)

(58) Field of Classification Search
CPC .................. F01P 2007/146; F16K 31/041; F16K 31/535; F16K 27/00; F01L 7/021
See application file for complete search history.

(56) References Cited

U.S. PATENT DOCUMENTS

| | | | | | |
|---|---|---|---|---|---|
| 2,056,684 A | * | 10/1936 | McLaren | | F01L 7/024 123/41.4 |
| 2,140,503 A | * | 12/1938 | Beckman | | F02B 25/00 123/51 BA |
| 2,261,567 A | * | 11/1941 | Scott | | F01L 5/06 123/65 BA |
| 2,354,305 A | * | 7/1944 | Cross | | F02F 1/04 123/80 BA |
| 2,730,089 A | * | 1/1956 | French | | F01L 7/08 123/80 DA |
| 2,989,955 A | * | 6/1961 | Dunne | | F01L 7/18 123/59.2 |
| 4,662,320 A | * | 5/1987 | Moriya | | F01L 1/053 123/198 C |
| 6,308,677 B1 | * | 10/2001 | Bohach | | F01L 7/021 123/190.1 |
| 2012/0107145 A1 | * | 5/2012 | Roby | | F16D 48/02 417/223 |
| 2015/0354436 A1 | * | 12/2015 | Park | | F01P 3/02 123/41.08 |

* cited by examiner

*Primary Examiner* — Long T Tran
(74) *Attorney, Agent, or Firm* — Vivacqua Crane

(57) ABSTRACT

An engine assembly having a thermal management device assembly is disclosed. The engine assembly includes an engine having an internal coolant passageway having at least one coolant port. The thermal management device assembly includes a rotary valve unit mounted on an engine accessory mounting bracket. The engine accessory mounting bracket includes an upper mounting platform having a mounting surface extending between an exterior face and an interior face of the mounting bracket, and at least one fluid channel extending through the mounting bracket from the mounting surface to the interior surface. The rotary valve unit is mounted onto the upper mounting platform. The at least one fluid channel of the engine accessory mount provides fluid communication between the coolant port of the internal coolant passageway of the engine and a valve port of the rotary valve unit.

16 Claims, 4 Drawing Sheets

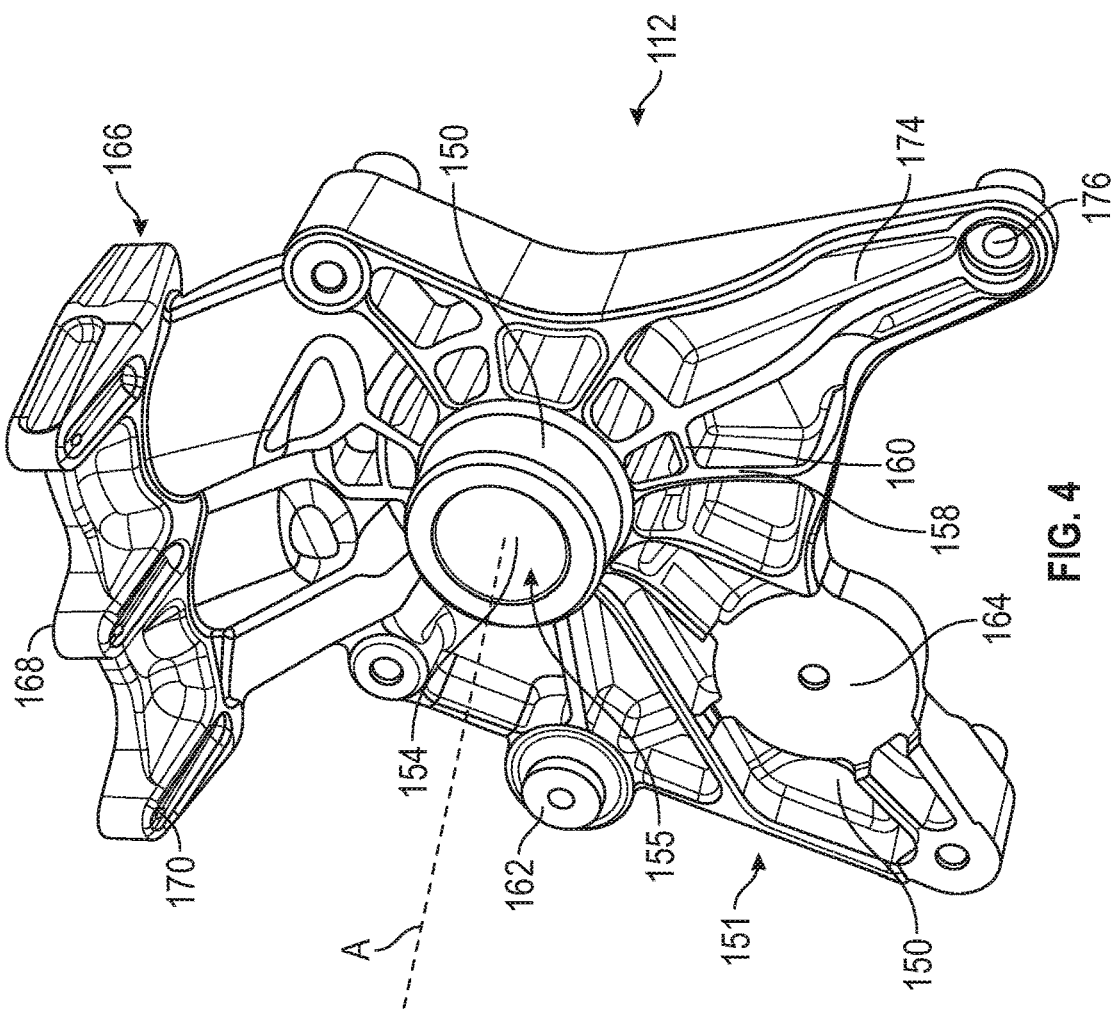
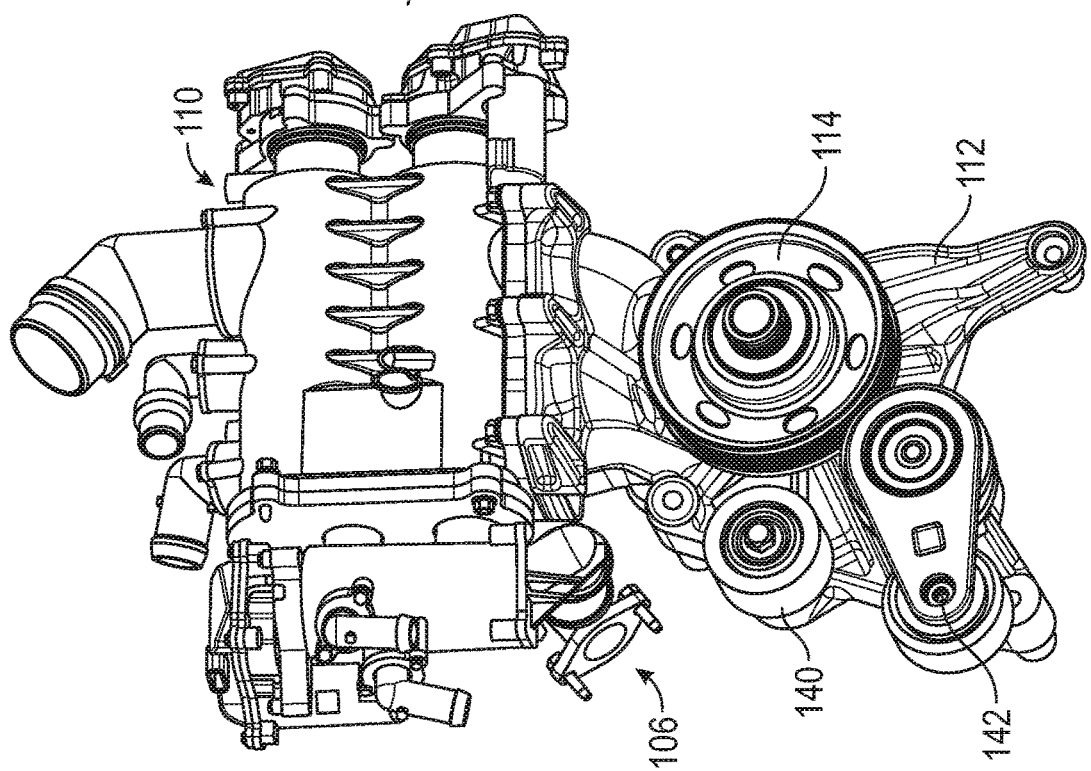

ENGINE THERMAL MANAGEMENT DEVICE ASSEMBLY HAVING AN ENGINE ACCESSORY MOUNTING BRACKET

INTRODUCTION

The present disclosure relates generally to an engine thermal management device assembly having a mounting bracket for an engine accessory, more particularly to an engine accessory mounting bracket having integral features for engine thermal management.

The trend in modern internal combustion engine designs is toward smaller displacement engines that provides power output capabilities similar to those of larger displacement engines while offering fuel efficiency in a lightweight and compact package. Engine technologies such as force induction, cylinder set strategy (CSS) architecture, Active Fuel Management (AFM), Spark Ignited Direct Injection (SIDI), Dual Overhead Camshafts (DOHC), and Variable Valve Timing (WT) are used to extract as much power as possible from smaller displacement engines on an as needed basis for a motor vehicle. However, the use of such technologies generate excess heat that needs to be managed in order to maintain the operating temperatures of the smaller displacement engines within an optimal range.

Active Thermal Management Cooling (ATMC) systems are used to control the coolant temperature circulating through coolant passageways defined within the engine by removing heat from areas to avoid thermal stress and sending heat where it is needed to reduce friction. As a result, cold start friction is reduced while combustion efficiency and exhaust cooling is enhanced during warm engine operation. ATMC systems are also used to heat the passenger compartment while also cooling the transmission of the vehicle. Typically, coolant is circulated through the ATMC system by an electric water pump and directed to various coolant passageways by a coolant diversion valve, such as a rotary valve unit. A typical rotary valve unit is an electronically controlled ball valve configured to distribute and control the flow of coolant from the radiator to various vehicle components including, but not limited to, the engine, transmission, and heater core.

The water pump and rotary valve unit, together with other engine accessories such as the air-conditioning compressor, alternator, drive pulley, and belt tensioner, are mounted onto the engine block using engine accessory mounting brackets. Engine accessory mounting brackets are configured to actively support the weight and strain of the engine accessories while in operation, therefore the mounting brackets may be bulky and occupy extensive space. As the engine displacement becomes smaller, so does the face of the engine block onto which the accessories are mounted as well as the engine compartment in which the engine block is placed in.

Thus, while engine accessory mounting brackets achieve their intended purpose, there is a need for improved mounting brackets that are sufficiently robust to support the mounted accessories while providing additional functions to accommodate the diminishing mounting surfaces available on the smaller engines and to provide improved packaging within the engine compartment.

SUMMARY

According to several aspects, an engine assembly having a thermal management device assembly is disclosed. The engine assembly includes an internal combustion engine having an internal coolant passageway including a first coolant port; an engine accessory mounting bracket having a first fluid channel attached to the exterior face of the engine; and a rotary valve unit having a first valve port mounted on the engine accessory bracket. The first fluid channel of the engine accessory mounting bracket provides fluid communication between the first coolant port of the internal coolant passageway of the engine and the first valve port of the rotary valve unit.

In an additional aspect of the present disclosure, the internal coolant passageway of the engine further includes a second coolant port, the engine accessory mounting bracket includes a second fluid channel, and the rotary valve unit further includes a second valve port. The second fluid channel of the engine accessory mounting bracket provides fluid communication between the second coolant port of the internal coolant passageway of the engine and the second valve port of the rotary valve unit.

In an additional aspect of the present disclosure, the internal coolant passageway of the engine further includes a third coolant port, the engine accessory mounting bracket includes a third fluid channel, and the rotary valve unit further comprises a third valve port. The third fluid channel of the engine accessory mounting bracket provides fluid communication between the third coolant port of the internal coolant passageway of the engine and the third valve port of the rotary valve unit.

In another aspect of the present disclosure, the engine assembly includes a pulley rotatably attached to the engine accessory bracket.

In another aspect of the present disclosure, the pulley is an electronically actuated clutch pulley configured to selectively rotate a cooling fan.

In another aspect of the present disclosure, the engine accessory mounting bracket includes an upper base portion defining an upper mounting surface. The rotary valve unit is mounted onto the upper mounting surface.

In another aspect of the present disclosure, the first fluid channel of the engine accessory mounting bracket extends to the upper mounting surface and in fluid communication with the first valve port of the rotary valve unit.

In another aspect of the present disclosure, the engine accessory mounting bracket includes an internal surface mounted on the exterior face of the engine. The first fluid channel of the engine accessory mounting bracket extends from the upper mounting surface to the internal surface and in fluid communication with the first coolant port of the internal passageway of the engine.

In another aspect of the present disclosure, the engine further includes a first gasket sandwiched between the upper mounting surface of the engine accessory mount and the rotary valve unit, and a second gasket sandwiched between the internal surface of the engine accessory mount and the exterior face of the engine.

According to several aspects, an accessory mounting bracket for thermal management of an internal combustion engine is disclosed. The accessory mounting bracket includes an exterior surface defining an exterior face; an interior surface defining an interior face opposite of the exterior face; a mounting platform having a mounting surface extending between the exterior face and the interior face; and a least one fluid channel extending through the mounting bracket from the mounting surface to the interior surface.

In an additional aspect, the mounting platform is located on an upper portion of the mounting bracket.

In an additional aspect of the present disclosure, the accessory mounting bracket further includes a cylindrical internal surface defining a bore hole through the accessory mounting bracket between the exterior surface and interior surface.

In another aspect of the present disclosure, the exterior surface defines an annular collar surrounding the bore hole.

In another aspect of the present disclosure, the exterior surface defines a plurality of radial ribs extending from the annular collar and at least one annular rib concentric with the annular collar intersecting integrally with the radial ribs.

In another aspect of the present disclosure, the accessory mounting bracket further includes a plurality of support arms having a plurality of through-holes extending therethrough from the exterior surface to the interior surface. The through-holes are sized to receive mounting bolts.

In another aspect of the present disclosure, the interior surface defines a boss surrounding at least one of the through-holes extending from the support arm, wherein the boss is configured to off-set the interior face of the accessory mount bracket from an exterior face of an engine.

According to several aspects, a thermal management device assembly for an internal combustion engine is disclosed. The thermal management device assembly includes an engine accessory mounting bracket having an exterior surface defining an exterior face, an interior surface defining an interior face opposite of the exterior face, a mounting platform having a mounting surface extending between the exterior face and the interior face, and a first fluid channel extending through the mounting bracket from the mounting surface to the interior surface; and a rotary valve unit mounted onto the mounting platform of the engine accessory mounting bracket, wherein the rotary valve unit comprises a first valve port in fluid communication with the first fluid channel.

In another aspect of the present disclosure, the engine accessory mounting bracket further includes a second fluid channel and a third fluid channel extending through the mounting bracket from the mounting surface to the interior surface. The rotary valve unit includes a second valve port in fluid communication with the second fluid channel and a third valve port in fluid communication with the third fluid channel.

In another aspect of the present disclosure, the engine accessory mounting bracket further comprises fan clutch assembly extending from the exterior face.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a perspective front view of the thermal management device assembly of FIG. 1, according to an exemplary embodiment;

FIG. 4 is a perspective front view of an engine accessory mounting bracket of the thermal management device assembly FIG. 3, according to an exemplary embodiment;

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
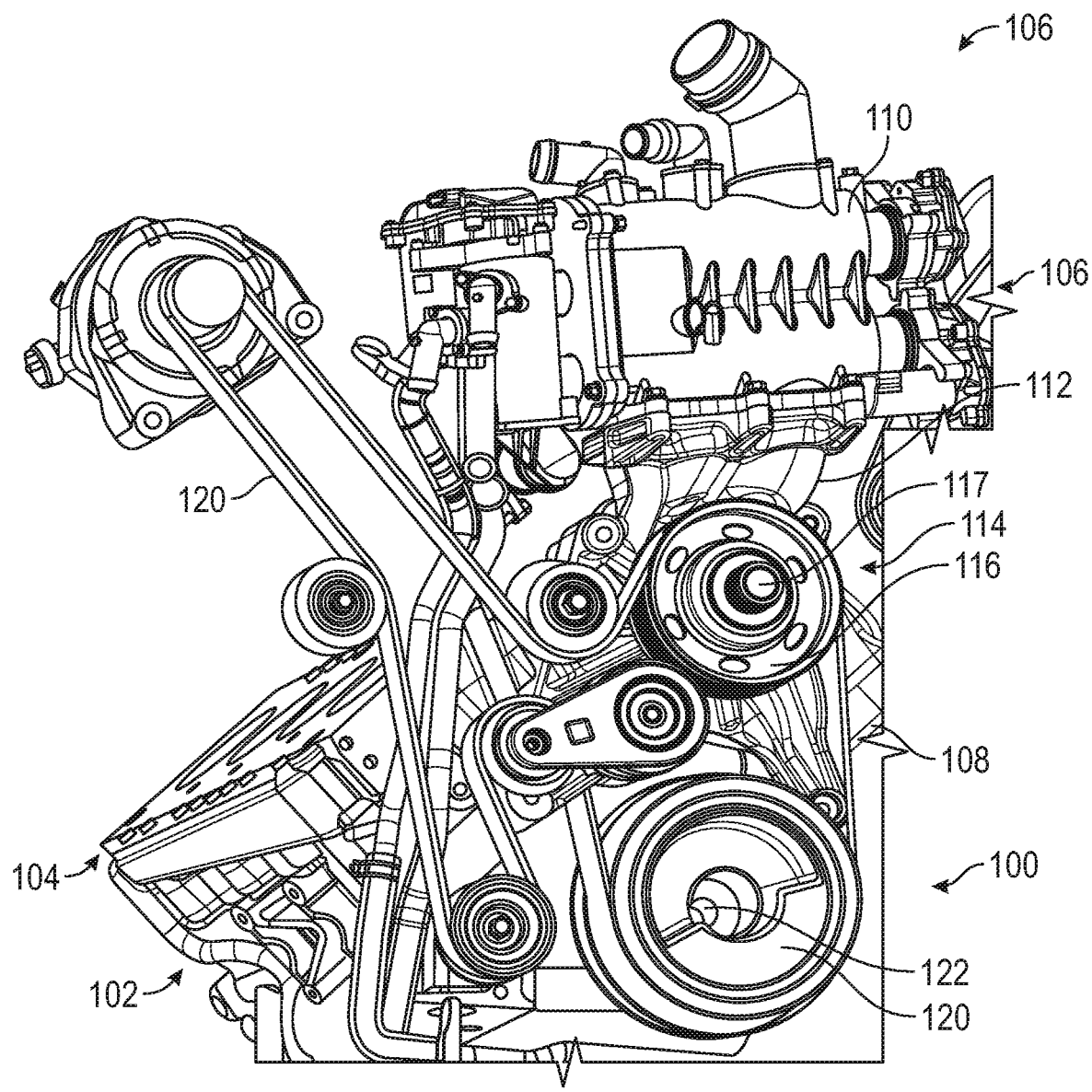
FIG. 1 is a partial perspective front view of an internal combustion engine assembly have a thermal management device assembly, according to an exemplary embodiment.

FIG. 1 shows a partial perspective front view of an internal combustion engine assembly 100 for a motor vehicle (not shown). It is understood that the term "motor vehicle" is inclusive of passenger vehicles including sports utility vehicles (SUV), buses, and trucks as well as watercraft, aircraft, and the likes where the vehicle uses an internal combustion engine as a power source.

The engine assembly 100 is composed of an engine block 102, a cylinder head 104 bolted onto the engine block 102, and an engine thermal management device assembly 106. The cylinder head 104 bolted onto the engine block 102 is referred to as the engine. The thermal management device assembly 106 includes a rotary valve unit 110 and an engine accessory mounting bracket 112. The rotary valve unit 110 is mounted onto and supported by the engine accessory mounting bracket 112, which is bolted to the exterior face 108 of the engine.

In the embodiment shown, the engine accessory mounting bracket 112 is an accessory drive fan bracket 112 having integral fluid channels, which are disclosed in detail below, used for thermal management of the engine assembly 100. The accessory drive fan bracket 112, also referred to herein as the accessory mounting bracket 112, is shown having a fan clutch assembly 114. The fan clutch assembly 114 includes a clutch pulley 116 configured to selectively rotate a cooling fan (not shown). The clutch pulley 116 is driven by a serpentine belt 120 that is engaged to a drive pulley 120. The drive pulley 120 is rotatably fixed to a crank-shaft 122 extending from the engine block 102.

When the combustion engine is in an operating state, the crank-shaft 122 continuously rotates the drive pulley 120, which in turns transmit the rotational motion to the clutch pulley 116 via the serpentine belt 120. The clutch pulley 116 includes an electronically actuated clutch pack 117 that selectively transmit the rotational movement of clutch pulley 116 to the cooling fan. While a fan clutch assembly 114 is shown and described herein, it is appreciated that the mounting bracket 112 is not limited to the mounting of a fan clutch assembly 114 and may be applicable to mounting of other engine accessories that utilizes a clutch pulley 116 such as alternators, water pumps, air-conditioning compressors, and the likes.

Figure 2:
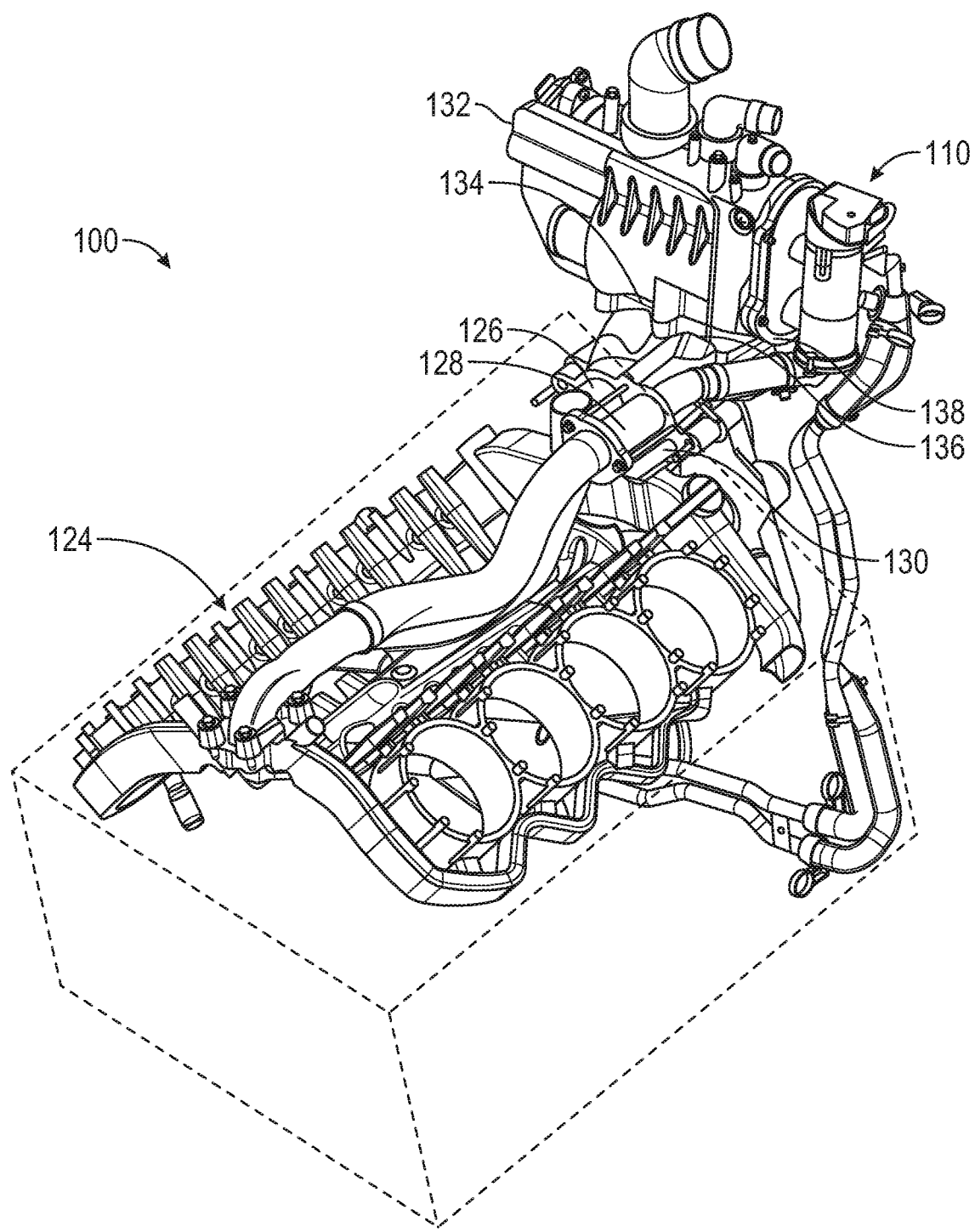
FIG. 2 is a partial perspective rear view of the internal combustion engine assembly of FIG. 1 having internal coolant passageways, according to an exemplary embodiment.

FIG. 2 shows a perspective rear view of the internal combustion engine assembly 100, in which the engine is shown represented in phantom lines. The internal coolant passageways 124 extending throughout the engine block 102 and cylinder head 104 are shown in solid lines. The engine block 102 and cylinder head 104 may be formed of a cast iron or aluminum alloy. The internal coolant passageways 124 may be formed during the casting process or formed by machining after the casting process. It is appreciated that the layout and pathways of the internal coolant passageways 124 as shown are exemplary only and it is not meant to be limiting. The internal coolant passageways 124 includes a first coolant port 126, a second coolant port 128, and a third coolant port 130 for conveying coolant flow into and out of the internal coolant passageways 124. One of the first coolant port 126 and second coolant port 128 may function as a coolant inlet and the other of the first coolant port 126 and second coolant port 128 may function a coolant outlet depending on the operational position of the rotary valve unit 110. The third coolant port 130 is an auxiliary port and may function as a coolant inlet or a coolant outlet.

The rotary valve unit 110 includes a valve housing 132 having a first valve port 134, a second valve port 136, and a third valve port 138. The rotary valve unit 110 further includes an electronically operated rotary valve (not shown) for selectively diverting and controlling coolant flow through the first valve port 134, the second valve port 136, and third valve port 138 of the valve housing 132. The first valve port 134, the second valve port 136, and third valve port 138 of the rotary valve unit 110 are in fluid communication with the first coolant port 126, the second coolant port 128, and the third coolant port 130 of the engine internal coolant passageways 124, respectively. The rotary valve unit 110 is mounted onto the engine accessory mounting bracket 112, which is bolted onto an exterior face 108 of the engine. The engine accessory mounting bracket 112 includes a plurality of discrete internal fluid channels that provides fluid communication between the valve ports 134, 136, 138 of the rotary valve housing 132 and the coolant ports 126, 128, 130 of the engine internal coolant passageways 124, respectively.

Referring to FIG. 3 is a front prospective view of the thermal management device assembly 106 of FIG. 1. The thermal management device assembly 106 includes the mounting bracket 112 onto which the rotary valve unit 110, the fan clutch assembly 114, an idler pulley 140, and a belt tensioner 142 are mounted onto. The mounting bracket 112 body includes a first fluid channel 144, a second fluid channel 146, and a third fluid channel 148 (best shown in FIG. 6) for communicating coolant flow between the first valve port 134, second valve port 136, and third valve port 138 of the rotary valve housing 132 and the corresponding first coolant port 126, second coolant port 128, and third coolant port 130 of the engine internal coolant passageways 124, respectively.

Figure 5:
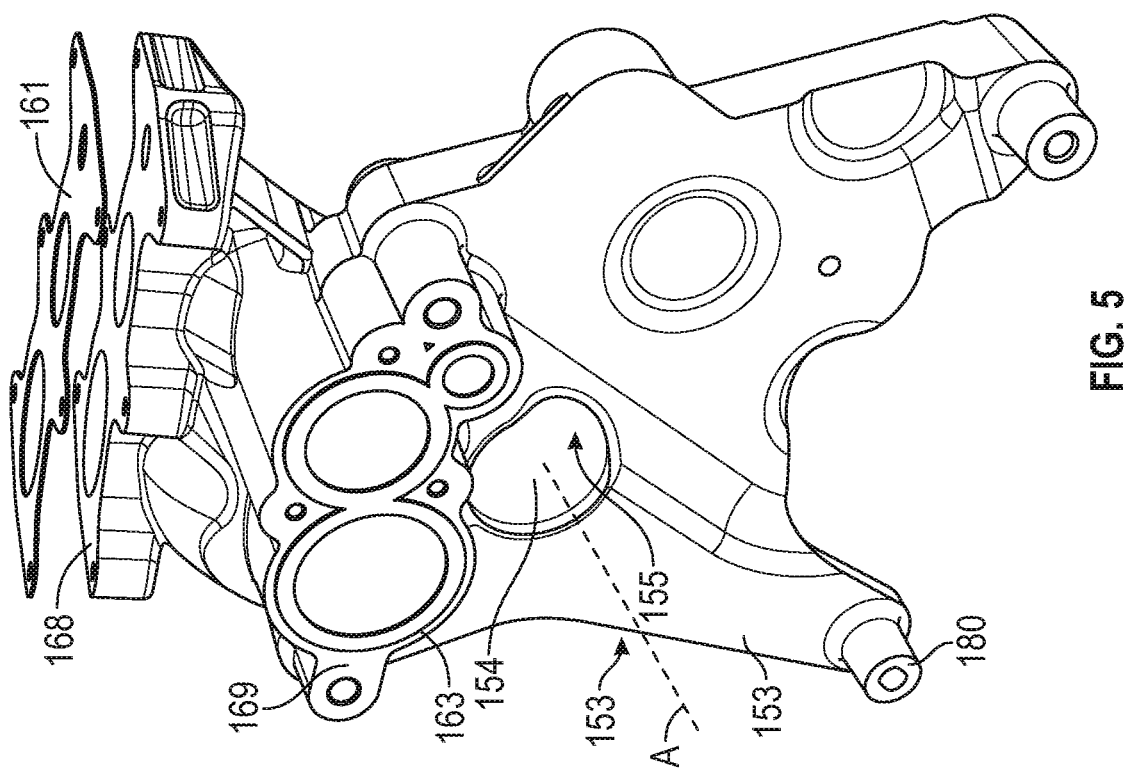
FIG. 5 is a perspective rear view of the engine accessory mounting bracket of FIG. 4, according to an exemplary embodiment.

Shown in FIG. 4 is a perspective front view of the mounting bracket 112 and shown in FIG. 5 is a perspective rear view of the mounting bracket 112 of the thermal management device assembly 106. The mounting bracket 112 includes an exterior surface 150 defining the exterior face 151 and an opposite interior surface 152 defining an internal face 153. An cylindrical internal surface 154 extends from the exterior surface 150 to the interior surface 152 defining a bore hole 155 extending through the mounting bracket 112 along an axis A. A fixed bearing (not shown) may be pressed fitted into the bore hole 155 against the cylindrical interior surface 154 for engaging a rotatable shaft of the fan clutch assembly 114. Alternatively, the shaft of the fan clutch assembly 114 may be press fitted into the bore and a rotatable bearing may be provided onto the shaft for the rotation of the clutch about the non-rotatable shaft. The exterior surface 150 and interior surface 152 may include structural features such as ribs 158, 160 and annular collar 156 cooperating with the cylindrical interior surface 154 to define a seat for receiving the bearing and/or shaft.

The exterior surface 150 defines an annular collar 156 surrounding the bore hole 155 and a plurality of radial ribs 158 extending from the annular collar 156 radially from the axis A. The exterior surface 150 further defines at least one 160 annular rib 160 concentric with the axis A. The annular rib 160 intersects the radial rib 158 to provide structural integrity to the mounting bracket 112. The exterior surface 150 further defines a first mounting surface 162 onto which the belt tensioner is pivotally mounted and a second mounting surface 164 onto which the idler pulley 140 is rotatably mounted.

The mounting bracket 112 includes an upper base portion 166, with respect to the direction of gravity, having a third mounting surface 168, also referred to as a valve unit mounting surface 168, facing in an upward direction onto which the rotary valve unit 110 is supportably mounted. The upper base portion 166 defines a plurality of mounting bolt holes 170 through which a corresponding number of mounting bolts (not shown) are inserted thereby bolting the rotary valve unit 110 onto the mounting bracket 112.

The mounting bracket 112 further includes a plurality of support arms 174 having a plurality of through-holes 176 extending there-through from the exterior surface 150 to the interior surface 152. The through-holes are sized to receive mounting bolts 172 for bolting the accessory mounting bracket 112 to the engine block 102. Referring to FIG. 5, the interior surface 152 of the bracket 112 defines a boss 180 surrounding each of the through-holes extending from the support arms 174. The bosses 180 are configured to off-set the internal face of the mounting bracket 112 from the exterior face of the engine block 102.

Figure 6:
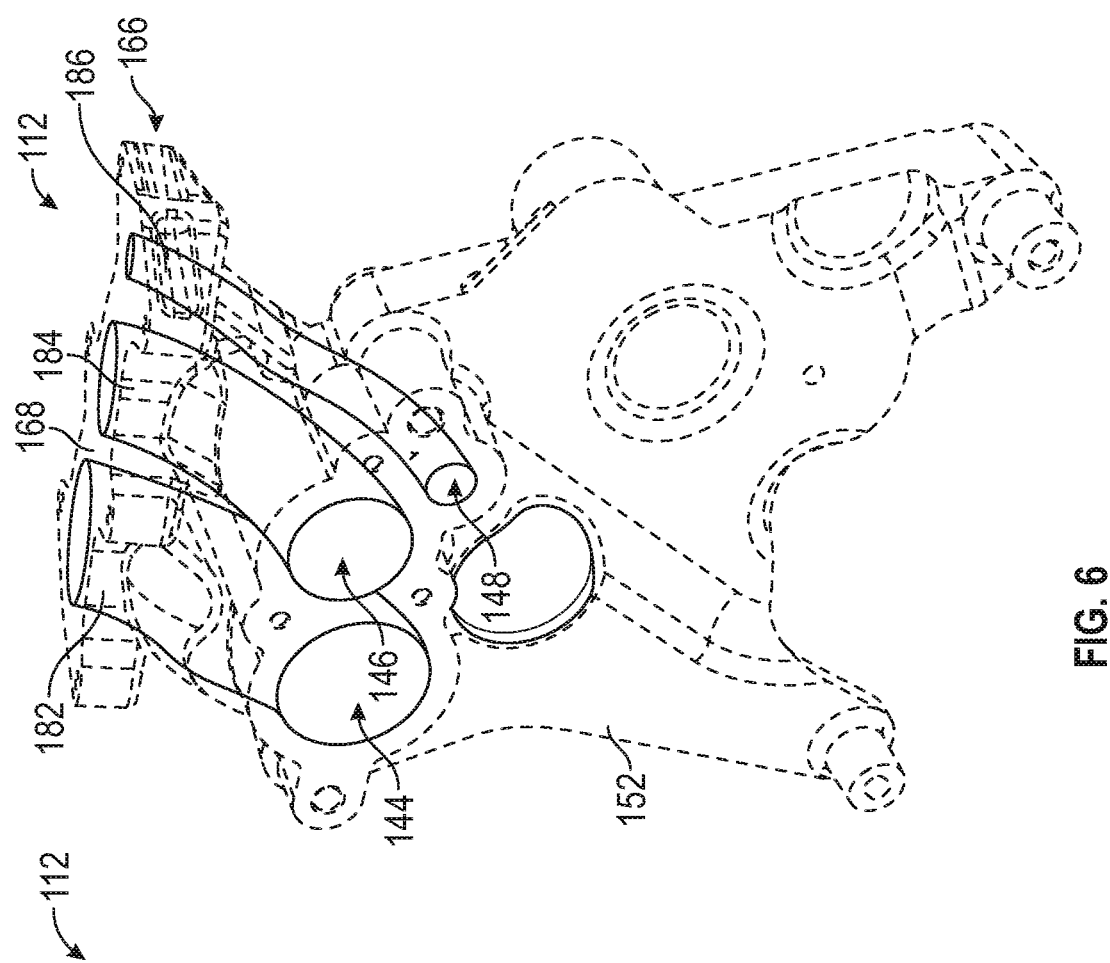
FIG. 6 is a perspective rear view of fluid channels extending through the mounting bracket of FIG. 5.

Referring to FIG. 6, the mounting bracket 112 includes a first internal surface 182, a second internal surface 184, and a third internal surface 186. The first internal surface 182 defines the first fluid channel 144 extending from the third mounting surface 168 to a fourth mounting surface 169, also referred to an engine mounting surface 169, defined on the interior surface 152. The fourth mounting surface 169 engages the exterior face 108 of the engine. The first fluid channel 144 provides fluid communication between the first valve port 134 of the rotary valve unit 110 and the first coolant port 126 of the internal coolant passageway 124. The second internal surface 184 defines the second fluid channel 146 extending from the third mounting surface 168 to the engine mounting surface 169. The second fluid channel 146 provides fluid communication between the second valve port 136 of the rotary valve unit 110 and the second coolant port 128 of the internal coolant passageways 124. The third internal surface 186 defines the third fluid channel 148 extending from the third mounting surface 168 to the engine mounting surface 169. The third fluid channel 148 provides fluid communication between the third valve port 138 of the rotary valve unit 110 and the third coolant port 130 of the internal coolant passageways 124.

A first gasket 161 sandwiched between the upper mounting surface of the engine accessory mounting bracket and the rotary valve unit. A second gasket 163 is sandwiched between the fourth mounting surface 169 of the engine accessory mounting bracket 112 and the exterior face 108 of the engine. The first and second gaskets 161, 163 may be that of a flat gasket, an O-ring type gasket, a sealant, or any other type of gaskets that can withstand at least two Bar of water pressure.

The accessory mounting bracket 112 may be manufactured by metal casting, milling, or additive manufacturing such as 3D printing for rapid prototyping. The internal fluid channels 144, 146, 148 of the accessory mounting bracket 112 provide coolant communication between the coolant passageways 124 within the engine and the rotary valve unit 110. The accessory mounting bracket 112 may be modify to support alternative belt 120 driven engine accessory such as A/C compressors, alternators, water pumps and tensioners. The thermal management device assembly 106 described above provides a compact package that is sufficiently robust to support the mounted engine accessories while providing additional service function to accommodate the diminishing mounting surfaces available on the smaller engines and to provide improved packaging within the engine compartment.

The description of the present disclosure is merely exemplary in nature and variations that do not depart from the gist of the present disclosure are intended to be within the scope of the present disclosure. Such variations are not to be regarded as a departure from the spirit and scope of the present disclosure.

I claim:

1. An engine assembly comprising:
an engine including an internal coolant passageway having a first coolant port, wherein the engine defines an exterior face;
an engine accessory mounting bracket attached to the exterior face of the engine, wherein the engine accessory mounting bracket comprises a first fluid channel; and
a rotary valve unit mounted on the engine accessory bracket, wherein the rotary valve unit comprises a first valve port; and
wherein:
the first fluid channel of the engine accessory mounting bracket provides fluid communication between the first coolant port of the internal coolant passageway of the engine and the first valve port of the rotary valve unit,
the engine accessory mounting bracket includes an upper base portion defining an upper mounting surface,
the rotary valve unit is mounted onto the upper mounting surface,
the first fluid channel of the engine accessory mounting bracket extends to the upper mounting surface and in direct fluid communication with the first valve port of the rotary valve unit,
the engine accessory mounting bracket includes an engine mounting surface mounted on the exterior face of the engine,
the first fluid channel of the engine accessory mount bracket extends from the upper mounting surface to the engine mounting surface and in fluid communication with the first coolant port of the internal coolant passageway of the engine; and
the engine assembly further comprising:
a first gasket sandwiched between the upper mounting surface of the engine accessory mounting bracket and the rotary valve unit; and
a second gasket sandwiched between the engine mounting surface of the engine accessory mounting bracket and the exterior face of the engine.

2. The engine assembly of claim 1, wherein:
the internal coolant passageway of the engine further comprises a second coolant port;
the engine accessory mounting bracket further comprises a second fluid channel; and
the rotary valve unit further comprises a second valve port; and
wherein the second fluid channel of the engine accessory mounting bracket provides fluid communication between the second coolant port of the internal coolant passageway of the engine and the second valve port of the rotary valve unit.

3. The engine assembly of claim 2, wherein:
the internal coolant passageway of the engine further comprises a third coolant port;
wherein the engine accessory mounting bracket further comprises a third fluid channel; and
the rotary valve unit further comprises a third valve port;
wherein the third fluid channel of the engine accessory mounting bracket provides fluid communication between the third coolant port of the internal coolant passageway of the engine and the third valve port of the rotary valve unit.

4. The engine assembly of claim 1, further comprising a pulley rotatably attached to the engine accessory mounting bracket.

5. The engine assembly of claim 4, wherein the pulley is an electronically actuated clutch pulley configured to selectively rotate a cooling fan.

6. The engine assembly of claim 1, further comprising at least one of an idler pulley and a belt tensioner mounted on the engine accessory mounting bracket.

7. An engine accessory mounting bracket for thermal management of an engine, comprising:
an exterior surface defining an exterior face configured to support a belt driven engine accessory;
an interior surface defining an interior face opposite of the exterior face, wherein the interior face is configured to mount onto an exterior face of the engine;
a mounting platform having a mounting surface extending between the exterior face and the interior face; and
a least one fluid channel extending through the engine accessory mounting bracket from the mounting surface to the interior surface.

8. The engine accessory mounting bracket of claim 7, wherein the mounting platform is located on an upper portion of the engine accessory mounting bracket.

9. The engine accessory mounting bracket of claim 8, further comprising a cylindrical internal surface defining a bore hole through the engine accessory mounting bracket between the exterior surface and interior surface.

10. The engine accessory mounting bracket of claim 9, wherein the exterior surface defines an annular collar surrounding the bore hole.

11. The engine accessory mounting bracket of claim 10, wherein the exterior surface defines a plurality of radial ribs extending from the annular collar and at least one annular rib concentric with the annular collar intersecting integrally with the radial ribs.

12. The engine accessory mounting bracket of claim 11, further comprising a plurality of support arms having a plurality of through-holes extending there-through from the exterior surface to the interior surface, wherein the plurality of through-holes are sized to receive mounting bolts.

13. The engine accessory mounting bracket of claim 12, wherein the interior surface defines a boss surrounding at least one of the through-holes extending from the support arms, wherein the boss is configured to off-set the interior face of the accessory mount bracket from an exterior face of an engine.

14. A thermal management device assembly for an internal combustion engine, comprising:
   an engine accessory mounting bracket including:
      an exterior surface defining an exterior face configured to support a belt driven engine accessory,
      an interior surface defining an interior face opposite of the exterior face, wherein the interior face is configured to mount onto an exterior face of an engine,
      a mounting platform having a valve unit mounting surface extending between the exterior face and the interior face, and
      a first fluid channel extending through the engine accessory mounting bracket from the valve unit mounting surface to the interior surface; and
   a rotary valve unit mounted onto the valve unit mounting surface of the mounting platform of the engine accessory mounting bracket, wherein the rotary valve unit comprises a first valve port in fluid communication with the first fluid channel.

15. The thermal management device assembly of claim 14, wherein:
   the engine accessory mounting bracket further comprises a second fluid channel and a third fluid channel extending through the engine accessory mounting bracket from the valve mounting surface to an engine mounting surface on the interior surface; and
   the rotary valve unit includes a second coolant port in fluid communication with the second fluid channel and a third coolant port in fluid communication with the third fluid channel.

16. The thermal management device assembly of claim 15, wherein the engine accessory mounting bracket further comprises a fan clutch assembly mounted onto the exterior face.

* * * * *